J. C. KENNEDY, M. S. ANDREWS & W. P. CLARK.

Apparatus for Dispensing Mineral Water, &c.

No. 5,815. Reissued March 31, 1874.

Witnesses,
W. A. Cambridge
C. E. Dyer

Inventors,
John C. Kennedy
Matthew S. Andrews
William P. Clark
per Teschemacher & Stearns
Att'ys AM. PHOTO-LITHOGRAPHIC Co. N.Y. (OSBORNE'S PROCESS.)

UNITED STATES PATENT OFFICE.

JOHN C. KENNEDY, OF TOLEDO, OHIO, AND MATTHEW S. ANDREWS, OF SOMERVILLE, AND WILLIAM P. CLARK, OF MEDFORD, ASSIGNORS TO JAMES W. TUFTS, OF MEDFORD, MASSACHUSETTS.

IMPROVEMENT IN APPARATUS FOR DISPENSING MINERAL WATERS, &c.

Specification forming part of Letters Patent No. 146,461, dated January 13, 1874; reissue No. 5,815, dated March 31, 1874; application filed March 13, 1874.

*To all whom it may concern:*

Be it known that we, JOHN C. KENNEDY, of Toledo, in the county of Lucas, and State of Ohio, MATTHEW S. ANDREWS, of Somerville, and WILLIAM P. CLARK, of Medford, both in the county of Middlesex and State of Massachusetts, have invented certain Improvements in Apparatus for Dispensing Mineral Water and other aerated or gaseous liquids, of which the following is a full, clear, and exact description, reference being had to the accompanying drawings, making part of this specification, in which—

Figure 1:
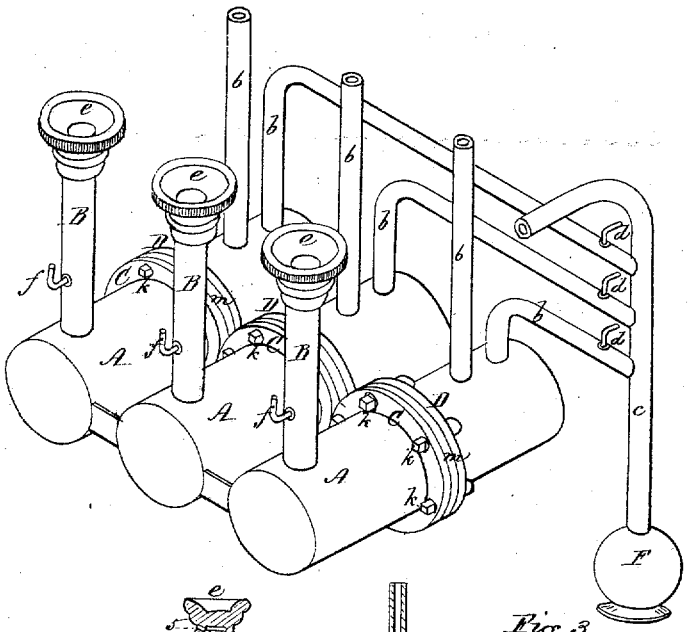
Figure 2:
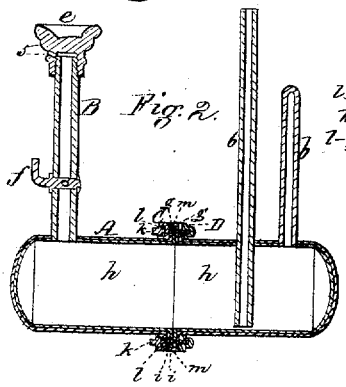
Figure 3:
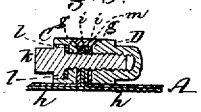

Figure 1 is a perspective view of our improved apparatus. Fig. 2 is a central vertical section through one of the cylinders and the pipes connected therewith. Fig. 3, sectional detail.

In apparatus for dispensing mineral-water and other aerated or gaseous liquids, as heretofore constructed, separate copper or iron fountains have been required, one for each description of liquid used, with extra fountains to insure a continuous supply, and to avoid the delay of recharging at inconvenient times. The number of fountains thus required involves great expense, to avoid which is the object of our invention, which consists in a cylinder or receptacle connected by a pipe or pipes with the fountain from which it is supplied with aerated water, the mineral salts, or other substance to be mixed with the aerated water, being introduced into the cylinder through a suitable opening or stand-pipe, closed by a cap or stop; the stand-pipe, when used, being provided, if desired, with a stop-cock, to enable it to retain the charge of salts or other substance until it is desired to allow it to pass into the cylinder, from which the contents are drawn by a pipe connected with the draft-cock.

To enable others skilled in the art to understand and use our invention, we will proceed to describe the manner in which we have carried it out.

In the said drawings, A A A represent three cylinders or receptacles, one for each kind of mineral water or other aerated liquid. To each of these cylinders is attached a pipe, *b*, which communicates with its interior, and also with a pipe, *c*, leading to a soda-fountain, F, from which the cylinder is supplied with aerated water, the pipe *b* being provided with a stop-cock, *d*, by turning which communication may be opened or closed, as required.

One cylinder only may be used if it is desired to draw but one kind of aerated liquid, or a series of two or more may be employed, according to the number of different beverages to be dispensed, and as the construction of these cylinders, and the manner in which they are operated, is similar in all respects, but one will be described.

At the end of the cylinder A, opposite to that at which the pipe *b* enters, is a stand-pipe, B, which communicates with the interior of the cylinder, and is closed at its top by a screw cap or stop, *e*, a stop-cock, *f*, being placed in the stand-pipe a short distance above the cylinder. The stop-cocks *d* and *f* being closed, the cap *e* is removed, and a charge of mineral salts, vegetable extracts, or other substance to be mixed with aerated water in the cylinder is introduced into the stand-pipe, and the cap replaced, when the cock *f* is opened, which allows the charge to drop into the cylinder. The cock *d* is now opened, which admits the aerated water from the fountain F through the pipes *c b* into the cylinder A, when it becomes thoroughly mixed with the charge of salts or other substance previously introduced through the stand-pipe B, thus forming the mineral water or other aerated beverage. During the admission of the aerated water the cap *e* is slightly unscrewed to open a small vent, 5, which allows of the escape of the superfluous gas or air from the cylinder, so that it can be entirely filled. The cap *e* is then screwed down tightly and the cock *f* closed, when the contents of the cylinder may be drawn off as wanted through a pipe, 6, leading to the draft-cock. The force of the gas in the aerated water is sufficient to eject the entire liquid contents of the cylinder after the cock *d* is closed. After charging the cylinder, the cock in the stand-pipe may be closed, the cap *e* removed, and a new charge of mineral salts or other desired substance introduced into the stand-pipe ready to be used when the cylinder is recharged, thus avoiding any delay in drawing the beverage—an important advantage at times when the demand is great—and also avoiding the escape of the gas which remains in the cylinder after the liquid contents have been drawn off. The stand-pipe may be dispensed with, and the salts or other substance introduced through an opening in the cylinder closed by a cap, but we prefer to use the stand-pipe, as it extends up above the ice with which the cylinder is surrounded, and which would be inconvenient to remove to gain access to an opening on its surface.

By the employment of an apparatus, constructed as above described, the expense and trouble of a separate fountain for each description of aerated water dispensed, and that of the extra fountain required to insure a continuous supply are avoided, one fountain only being required for the general supply of all of the cylinders A, as well as the soda-water apparatus, this main fountain not requiring a sheet-tin lining, as is essential where the corrosive salts are employed, whereas it has heretofore been necessary to employ a separate fountain with sheet-tin lining for each kind of mineral water dispensed, the cost of each of which is several times as great as that of one of the cylinders A, and a great saving is thus effected, and the apparatus at the same time rendered more compact. The cylinder or receptacle A is made of copper or other suitable metal in two portions, each having a flange, *g*. Within this cylinder is fitted a lining, *h*, of sheet-tin, also made in two parts, each provided with a flange, *i*, and against the flanges *g* are fitted two heavy clamping-rings, C D, which are drawn toward each other by screw-bolts *k*, so as to confine the flanges *g i* between them, and thus support them, and enable the joint to withstand the pressure of the gas. The bolts *k* pass through openings in the ring C, and corresponding openings in the flanges *g i*, and screw into the ring D. Each of the openings in the ring C is enlarged at its mouth, forming a cavity or recess for the reception of a soft-metal or elastic washer, *l*, which surrounds the bolt *k* under its head, and is compressed thereby, thus effectually preventing leakage around the bolt. After the bolts are tightened up the groove or space between the rings C D is filled with solder *m*, which unites the two flanges *i* of the tin lining, the flanges *g* of the cylinder A, and the rings C D, making a perfectly tight joint, and effectually preventing leakage, the joint, as before described, being supported against the pressure of the gas within the cylinder by the rings C D and bolts *k*. This construction enables us to solder the two portions of the sheet-tin lining together, as the clamping rings and bolts render the joint sufficiently strong to withstand the pressure of the gas, whereas, if the attempt were made to unite the two portions of a fountain lined with sheet-tin by means of a ring of solder of sufficient width and thickness to make a strong joint, the great heat required in the operation would melt the sheet-tin lining and expose the copper, and, if the joint were merely soldered, without a strengthening-band or clamping rings and bolts, it would not be able to withstand the pressure of the gas, and would soon commence to leak.

We claim—

In combination with the soda-fountain F and pipes *c b*, the cylinder A provided with an outlet-pipe, 6, and an opening through which the mineral salts or other substance can be introduced, constructed and operating substantially as and for the purpose set forth.

JOHN C. KENNEDY.
MATTHEW S. ANDREWS.
WILLIAM P. CLARK.

Witnesses to signature of JOHN C. KENNEDY:
JAMES S. JENKS,
O. M. EDDY.

Witnesses to signatures of MATTHEW S. ANDREWS and WILLIAM P. CLARK:
P. E. TESCHEMACHER,
N. W. STEARNS.